(12) United States Patent
Drexler et al.

(10) Patent No.: US 7,447,913 B2
(45) Date of Patent: Nov. 4, 2008

(54) PORTABLE DATA CARRIER PROVIDED WITH ACCESS PROTECTION BY DIVIDING UP CODES

(75) Inventors: Hermann Drexler, Munich (DE); Harald Vater, Giessen (DE)

(73) Assignee: Giesecke & Devrient GmbH, Munich (DE)

( * ) Notice: Subject to any disclaimer, the term of this patent is extended or adjusted under 35 U.S.C. 154(b) by 1118 days.

(21) Appl. No.: 10/168,548

(22) PCT Filed: Dec. 20, 2000

(86) PCT No.: PCT/EP00/13031

§ 371 (c)(1),
(2), (4) Date: Sep. 11, 2002

(87) PCT Pub. No.: WO01/48974

PCT Pub. Date: Jul. 5, 2001

(65) Prior Publication Data

US 2003/0061498 A1    Mar. 27, 2003

(30) Foreign Application Priority Data

Dec. 28, 1999 (DE) ............................... 199 63 408

(51) Int. Cl.
*G06F 12/14* (2006.01)
(52) U.S. Cl. ........................................ 713/189; 380/277
(58) Field of Classification Search .................. 380/28, 380/286, 277; 713/189
See application file for complete search history.

(56) References Cited

U.S. PATENT DOCUMENTS

| 4,375,579 | A | * | 3/1983 | Davida et al. ................. 380/28 |
| 4,797,921 | A | * | 1/1989 | Shiraishi ...................... 380/28 |
| 5,199,070 | A | * | 3/1993 | Matsuzaki et al. ............ 380/30 |
| 6,459,791 | B1 | * | 10/2002 | M'Raihi et al. ............... 380/30 |
| 6,965,673 | B1 | * | 11/2005 | Boneh et al. .................. 380/28 |
| 7,249,109 | B1 | * | 7/2007 | Silverbrook et al. .......... 705/67 |

FOREIGN PATENT DOCUMENTS

| DE | 198 22 217 A1 | 11/1999 |
| WO | 97/22192 | 6/1997 |

* cited by examiner

*Primary Examiner*—Andrew L Nalven
(74) *Attorney, Agent, or Firm*—Bacon & Thomas, PLLC

(57) ABSTRACT

The invention relates to a data storage medium having a semiconductor chip which has at least one memory in which an operating program is stored which contains a number of commands, with each command producing signals which can be detected from outside the semiconductor chip.

According to the invention the data storage medium is designed in order to split secret data, which is stored in the semiconductor chip in order to carry out security-relevant or safety-relevant operations or is generated by this semiconductor chip, into at least three data parts, with an arithmetic unit being included in order to calculate a random number and in order to divide the random number, with the first data part being the integer result of the division process, the second part being the remainder of the division process, and the third part being the random number itself.

14 Claims, 1 Drawing Sheet

PORTABLE DATA CARRIER PROVIDED WITH ACCESS PROTECTION BY DIVIDING UP CODES

BACKGROUND OF THE INVENTION

1. Field of the Invention

The invention relates to a data storage medium which has a semiconductor chip in which secret data is stored and is processed.

2. Description of the Related Art

Data storage media which contain a chip are used in a large number of different applications, for example in order to carry out financial transactions, for payment for goods or services, or as an identification means for controlling access checks. In all these applications, secret data which must be protected against access by unauthorized third parties is generally processed within the chip of the data storage medium. This protection is ensured inter alia by the fact that the internal structures of the chip have very small dimensions so that access to these structures with the aim of extracting data which is being processed in these structures is very difficult. In order to make access even harder, the chip can be embedded in a very securely adhering compound whose forced removal results in the semiconductor wafer being destroyed, or at least in the secret data stored in it being erased. It is likewise also possible to provide the semiconductor wafer with a protective layer during its production process, which cannot be removed without destroying the semiconductor wafer.

With appropriate technical equipment, which admittedly is extremely expensive but is nevertheless in principle available, it would be possible for an attacker to expose the internal structure of the chip, and to investigate it. The internal structure of the chip could be exposed, for example, by means of special etching methods or by means of a suitable grinding process. The structures of the chip exposed in this way, such as interconnects, could be made contact with using microprobes or could be investigated using other methods in order to determine the signal waveforms in these structures. It would then be possible to attempt to use the detected signals to determine secret data from the data storage medium, such as secret keys, in order to use these for manipulation purposes. It would likewise be possible to attempt to deliberately influence the signal waveforms in the exposed structures via the microprobes.

Recently, furthermore, methods have become known which allow the secret data, in particular the secret key, to be deduced by measuring the current consumption or the timing for the encryption process (Paul C. Kocher, "Timing attacks on implementation of Diffie-Hellman, RSA, DSS, and other Systems", Springer Verlag 1998; WO 99/35782).

One simple attack of this type is the "Simple Power Analysis" (SPA). In this analysis method, by way of example, a known message M is subjected to encryption using a secret key d, that is to say the encrypted text $Y=M^d$ mod n is formed. During the modular exponentiation process, a squaring operation is carried out with the intermediate result and a multiplication operation is carried out with M if there is a "1" in the exponent d, while only a squaring operation with the intermediate result is carried out if there is a "0" in d. If M is known, the message M can be identified by observing the current and/or timing during the operations. Since this message is always used if a "1" is present in d, the key can be deduced without any problems.

This attack can easily be countered simply by making changes in the message M or in the key d. Further analysis methods are known from Paul C. Kocher, "Timing Attacks on implementation of Diffie-Hellman, RSA, DSS, and other Systems", Springer Verlag 1998 and from the international patent application WO 99/35782, in which the key can be deduced even if the message or the key is modified, that is to say scrambled, by recording a large number of measurement curves in which the current response of the integrated circuit is measured ("Differential Power Analysis" (DPA) or Higher Order DPA).

So-called "Exponent Blinding" has been proposed as a security measure, in which the secret key d was not used directly.

Firstly, instead of the secret key d, $d+r*\Phi$ can be used for the encryption process, where r is a random number and $\Phi$ is the Euler PHI function. Specifically, $n=p*q$ for the RSA algorithm, where p and q are prime numbers and hence $\Phi=(p-1)*(q-1)$. Using the Euler theorem:

$$M^d \bmod n = M^{d+r*\Phi} \bmod n.$$

If a different random number r is used for each calculation, it is impossible to deduce the key d, even if a large number of series of analysis processes are carried out.

Alternatively, the secret key d can be broken down into $d1*d2 \bmod \Phi$, so that, for the encryption process, $Y=M^{d1*d2 mod \Phi} \bmod n = (M^{d1})^{d2} \bmod n$.

The disadvantage of this protection option is, however, that the prime numbers p and q or $\Phi$ are normally not stored on a smart card, owing to lack of memory space.

The secret key d can also be broken down into a sum of d1 and d2. Then, $d=d1+d2$ and, for the encryption process:

$$Y=M^{d1+d2} \bmod n = M^{d1}*M^{d2} \bmod n = (M^{d1} \bmod n * M^{d2} \bmod n) \bmod n.$$

In order to obtain a sufficiently high security level, a new random d1/d2 pair must be chosen for each calculation for breaking down the exponent into $d=d1+d2$ or $d=d1*d2 \bmod \Phi$. Since the production of random numbers is generally very slow, this method is not suitable for use in smart cards. Furthermore, the computation complexity for the modular exponentiation process is increased considerably, so that this is also not consistent with use in a smart card.

BRIEF SUMMARY OF THE INVENTION

One object of the invention is thus to protect secret data, which is contained in the chip of a portable data storage medium, against unauthorized access, with the aim of ensuring that the data is still used efficiently, as before.

BRIEF DESCRIPTION OF THE DRAWINGS

Against the background of the precharacterizing clauses of claims 1, 7 and 12, this object is achieved by the characterizing features of the respective claim.

DETAILED DESCRIPTION OF THE INVENTION

Figure 1:
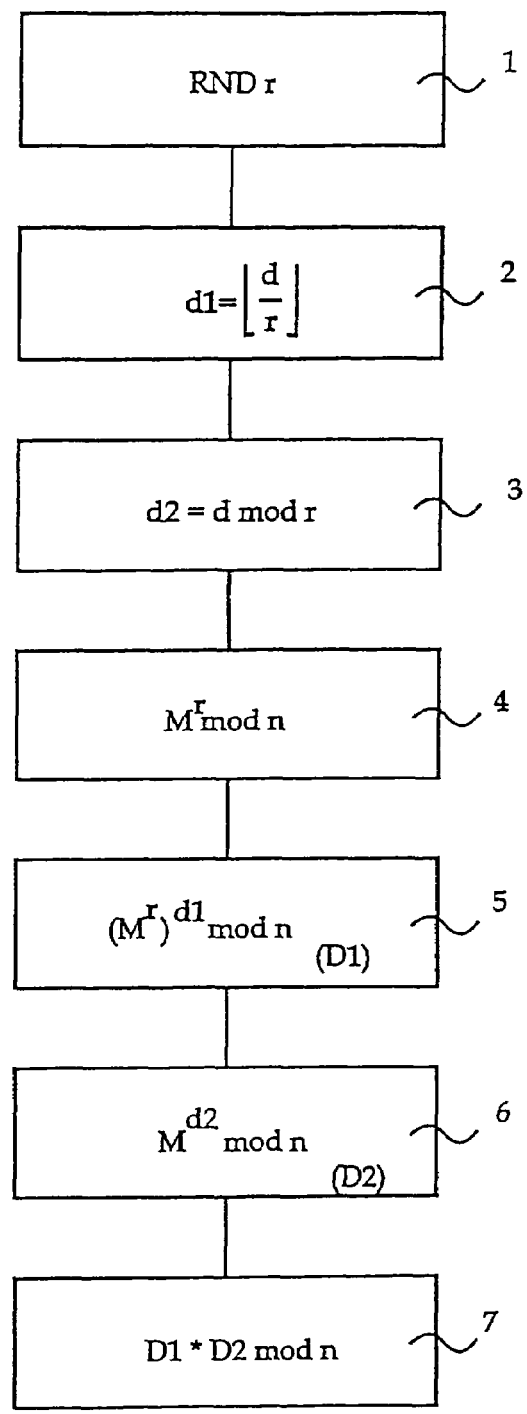
FIG. 1 is a flow chart of a method for forming an encrypted message.

The invention provides a data storage medium having a semiconductor chip which has at least one memory in which an operating program is stored which contains a number of commands, with each command producing signals which can be detected from outside the semiconductor chip.

According to the invention, the data storage medium is designed in order to split secret data, which is stored in the semiconductor chip in order to carry out security-relevant or safety-relevant operations or is generated by this semiconductor chip, into at least three data parts. It contains a computer unit or arithmetic unit for calculation of a random number and for division of the secret data by the random number. The first data part comprises the integer result of the division process, the second part is produced by the remainder of the division process, and the third data part is the random number itself.

According to one advantageous refinement of the invention, the secret data comprises the secret key for encryption of messages, with the secret key preferably being used as an exponent for the calculation of group operations in asymmetric encryption methods (public key methods, for example elliptical curves, RSA, etc.) or modulo operations.

A further refinement of the invention provides for the random number to be chosen such that the length of the random number together with the Hamming weight of the random number is approximately constant for different random numbers. This means that the secret data cannot be deduced from the time period which for the modular exponentiation process, which time period is proportional to the length of the exponent and to the Hamming weight of the exponent.

The method according to the invention provides for the secret key to be divided by a comparatively short random number. The division result, without the remainder, provides the first part of the key, the remainder provides the second part of the key, and the random number provides the third part.

For the encryption of a message M, $Y=M^d$ mod n. The secret key d is split into d1, d2 and r, where d1=d/r (r is a random number), without a remainder. The remainder from the division process is the second part d2 of the key d, so that d2=d mod r, and for the key d, d is thus d=r*d1+d2.

This results in an encryption text $$Y = M^d \bmod n = M^{r*d1+d2} \bmod n = (M^r)^{d1} * M^{d2} \bmod n = ((M^r)^{d1} \bmod n * M^{d2} \bmod n) \bmod n.$$

The procedure for forming the encrypted text Y is illustrated in FIG. 1.

First of all, a random number r is formed in step 1. In step 2, the first key part d1 is then calculated from the secret key d by division by the previously obtained random number r. The second part d2 of the key is obtained by forming d mod r.

The calculation of the encryption text is started in step 4 by first of all calculating $M^r$ mod n. $D1=(M^r)^{d1}$ mod n is calculated in the next step 5, and $D2=M^{d2}$ mod n is calculated in step 6.

The sequence of the individual computation operations may, of course, in some cases also be interchanged in time. It is thus possible to calculate $M^{d1}$ mod n first of all, and then to calculate $(M^{d1})^r$ mod n, since $(M^r)^{d1}$ mod n=$(M^{d1})^r$ mod n.

In the final step 7, the intermediate results D1 and D2 are multiplied with one another, and the modulo for n is formed. Hence:

$$D1*D2 \bmod n = M^d \bmod n = Y.$$

The invention has the advantage that neither of the prime numbers p and q need be stored on the card in order to form Φ, and it also has the advantage of avoiding the production of long random numbers, which demands a very long computation time. The computation complexity for the modulo operations is also kept within reasonable limits, so that the solution according to the invention may be used both securely and efficiently in a smart card. Furthermore, no data in the non-volatile memory of the data storage medium need be modified for the described method, this being a time-consuming process which would lead to degradation of the nonvolatile memory.

Since modular exponentiation requires a time period which is proportional to the length of the exponent and of the Hamming weight of the exponent, a further improvement in security can be achieved if the random number r is produced using a method in which the length of r and the Hamming weight of r result in a constant.

The invention can be used for a large number of encryption systems. Reference is made, by way of example, to RSA encryption, encryption based on ElGamal, DSA, and elliptical curve systems etc.

The invention claimed is:

1. Data storage medium comprising a semiconductor chip having at least one memory in which an operating program is stored which contains a number of commands, with each command producing signals which can be detected from outside the semiconductor chip, wherein the data storage medium is arranged to split secret data, which is stored in the semiconductor chip in order to carry out security-relevant or safety-relevant operations or is generated by this semiconductor chip, into at least three data parts, and including an arithmetic unit arranged to calculate a random number and to divide the secret data by the random number, with a first data part being the integer result of the division operation, a second data part being the remainder of the division operation, and a third data part being the random number itself.

2. Data storage medium according to claim 1, wherein the secret data is a secret key for encryption of messages.

3. Data storage medium according to claim 1, wherein the secret data is used as an exponent for the calculation of group operations in asymmetric encryption methods.

4. Data storage medium according to claim 1, wherein the secret data is used as an exponent for the calculation of modulo operations.

5. Data storage medium according to claim 2, wherein the secret key is used as an exponent for the calculation of modulo operations.

6. Data storage medium according to claim 1, wherein the random number is chosen such that the length of the random number together with the Hamming weight of the random number is approximately constant for different random numbers.

7. Method for protection of secret data in data storage media having a semiconductor chip which has at least one memory in which an operating program is stored which contains a number of commands, with each command producing signals which can be detected from outside the semiconductor chip, comprising: splitting secret data into at least 3 parts, said secret data being stored, in the semiconductor chip in order to carry out security-relevant or safety-relevant operations or is generated by this semiconductor chip, with a random number being calculated first of all and a first data part being obtained from the integer result of a division of the secret data by the random number, a second data part comprising the remainder of the division process, and a third data part being the random number itself.

8. Method according to claim 7, wherein the secret data is a secret key for encryption of messages.

9. Method according to claim 7, wherein the secret data is used as an exponent for the calculation of group operations in asymmetric encryption methods.

10. Method according to claim 7, wherein the secret data is used as an exponent for the calculation of modulo operations.

11. Method according to claim 8, wherein the secret key is used as an exponent for the calculation of modulo operations.

12. Method according to claim 7, wherein the random number is chosen such that the length of the random number together with the Hamming weight of the random number is approximately constant for different random numbers.

13. Method for forming an encrypted message in a system for authentication of system components or for forming a signature, comprising:

forming a random number r, calculating a first key part (d1) from a secret key d by division by the previously obtained random number r, obtaining a second part (d2) of the key by forming d mod r, starting the calculation of the encrypted text by calculating $M^r$ mod n, calculating $D1=(M^r)^{d1}$ mod n and $D2=M^{d2}$ mod n, and multiplying the intermediate results D1 and D2 by one another and the forming modulo for n.

14. Method according to claim 13, wherein $M^{d1}$ mod n is calculated first of all, followed by $(M^{d1})^r$ mod n, in order to calculate D1.

* * * * *